CYCLICALLY OPERABLE DIGITAL ACCUMULATING APPARATUS

Filed Jan. 31, 1955 2 Sheets-Sheet 1

Siegfried Reisch,
Inventor
by Ev. R. Halbert,
Atty.

CYCLICALLY OPERABLE DIGITAL ACCUMULATING APPARATUS

Filed Jan. 31, 1955 2 Sheets-Sheet 2

Siegfried Reisch,
Inventor
by W. R. Hulbert,
Atty.

United States Patent Office 2,917,236
Patented Dec. 15, 1959

2,917,236

CYCLICALLY OPERABLE DIGITAL ACCUMULATING APPARATUS

Siegfried Reisch, Ivrea, Italy, assignor to Ing. C. Olivetti & C., S.p.A., Ivrea, Italy, a corporation of Italy Application January 31, 1955, Serial No. 485,176
Claims priority, application Italy February 3, 1954
9 Claims. (Cl. 235—176)

The present invention relates to digital computing apparatus of the type wherein an accumulator is provided with a plurality of bistable unit accumulating elements arranged in denominational orders, as described for example in the specification of the co-pending patent application Serial Number 385,866, filed October 13, 1953, now Patent No. 2,887,269, issued May 19, 1959.

According to said specification, the accumulator is cyclically movable so as to sequentially present its accumulating elements to a commutator device having means for sensing said elements and means operable for commutating said elements to enter an impulse into the accumulator. The commutating means are controlled by an intermediary device having two distinct stable states, usually a flip-flop. Upon receiving an impulse to be entered into the accumulator, the intermediary device is set from its normal state to an operative state which is adapted to operate the commutating means to commutate the accumulating element presented thereto. During an accumulator cycle said flip-flop is thus capable of operating the commutating means once for each denominational order. Therefore, an operation of addition of two decimal numbers requires ten accumulator cycles, rendering the apparatus comparatively slow.

The purpose of the invention is to eliminate this disadvantage and to provide an apparatus wherein the elementary operations of additions and/or subtraction may be performed at a speed which is much higher than was heretofore possible.

In accordance with the invention I provide in such a computing machine means for generating an impulse for each unit of an amount to be entered into said accumulator. I furthermore provide a storing device having a plurality of distinct stable states, said device being controlled by said generating means to store a unit for each one of its states, and means controlled by said device for operating said commutating means to commutate a corresponding number of elements during a single accumulator cycle.

It will thus be apparent that the number of accumulator cycles required for performing an elementary operation may be reduced. This reduction is particularly significant if the number of distinct states of the storing device is equal to the base of the numerical notation, for example ten in the case of the decimal notation.

In this latter case one accumulator cycle is required for an elementary operation.

Further objects and details of the invention will be apparent from the following description of a preferred embodiment thereof, taken in conjunction with the accompanying drawings in which.

Figure 1:
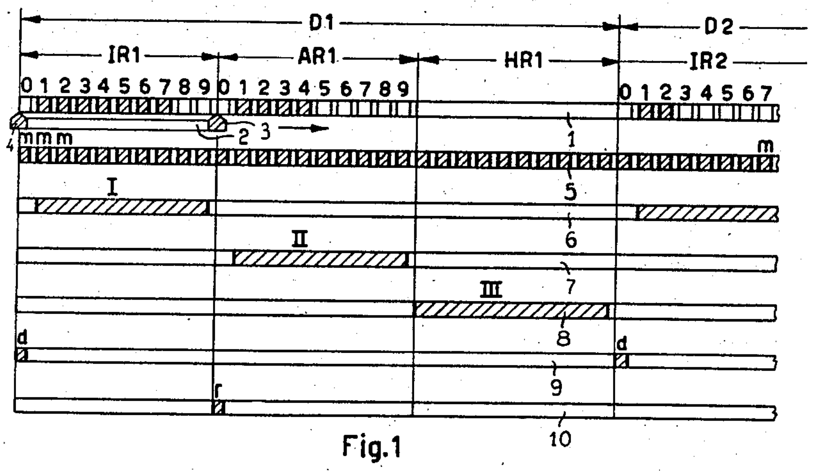
Fig. 1 is a schematical view of the accumulator and of the timer of a digital computing apparatus embodying the invention.

Referring now to Fig. 1, the reference numeral 1 indicates the accumulator, which may be of any suitable type, but which in the present embodiment is of the known magnetic tape or drum type, shown here as developed in a plane.

An impulse representing a digital unit is entered into the accumulator by recording a certain one of two different magnetic conditions in an elemental area of the magnetic track of the accumulator in a manner known in the art. Though said magnetic track represents a continuous uninterrupted recording medium, it will be supposed here, to make the description easier to understand, that the magnetic track is divided in a number of imaginary discrete elemental areas, which act as bistable unit accumulating elements and will be referred to hereinafter as cells. A cell wherein a digital unit has been entered will be referred to hereinafter as a cell filled with a positive magnetic point or simply as a filled cell. A cell wherein no digital unit has been entered will be referred to hereinafter as a cell filled with a negative magnetic point or simply as an unfilled cell. Generally speaking, said points may be written, read and erased. A point of a certain polarity is erased when a point of the opposed polarity is written thereon.

The accumulator 1 shown in Fig. 1 is formed of an input register IR, an accumulating register AR and an auxiliary register HR. As shown in Fig. 1, each denominational order of the accumulator, such as the orders D1, D2, . . . D*n*, is formed of the corresponding suborders of the registers IR, AR and HR, said suborders being arranged in the sequence IR1, AR1, HR1, IR2, AR2, HR2 . . . IR*n*, AR*n*, HR*n* along the magnetic track of the accumulator. The amount to which an addend is to be added or from which a subtrahend is to be subtracted is stored in the accumulating register AR, whereas said addend and said subtrahend, respectively, which represent the amount to be entered into the accumulating register are first stored in the input register IR. No amount is stored in the auxiliary register HR, the scope of which will be disclosed hereinafter.

Each suborder of both the registers IR and AR comprises nine imaginary cells, each cell being represented by a small rectangle in Fig. 1. Since the reference D1 represents the units order, the reference D2 represents the tens order and so forth, and inasmuch each filled cell is represented by a shaded rectangle, the amounts which according to Fig. 1 are stored in the accumulator are 27 in the input register IR and 4 in the accumulating register AR. It should be noted that each suborder of the registers IR and AR provides a further cell numbered "0," preceding the "1" cell of the suborder. However, this "0" cell is never filled with a magnetic point and simply represents a gap in the registers.

The accumulator 1 is cyclically rotatable so as to sequentially present its cells to a commutator device, such as a commutator head 2 which, when considered in the relative motion, moves in the direction of the arrow with respect to the accumulator. The commutator head 2 comprises two magnetic heads 3 and 4, the head 4 being arranged at a distance of one suborder from the magnetic head 3, towards the lower orders.

From the movement of the accumulator various timing signals are derived to control the operations occurring during the computing process. Said signals may be generated by any known means, such as magnetic tracks rotating with the accumulator. Fig. 1 shows the tracks from 5 to 10, which are integral with the accumulator 1 and which are cyclically sensed by a corresponding number of suitable magnetic heads, not shown in the drawings. It should be noted, however, that the magnetic heads sensing the tracks from 5 to 10 are vertically aligned with the head 3.

Recorded in the track 5 in correspondence with each suborder of the accumulator 1 are ten signals *m*, which represent the usual clock pulses. Recorded in the track 6 in correspondence with the cells from "1" to "9" of each suborder of the register IR is a phase signal I. A similar phase signal II is recorded in the track 7 in correspondence with the cells from "1" to "9" of each suborder of the register AR. A further phase signal III is recorded in the track 8 in correspondence with the ten *m* signals generated during each suborder of the register HR. Recorded in the track 9 in correspondence with the beginning of each suborder of the register IR is a signal *d*. A similar signal *r* is recorder in the track 10 in correspondence with the beginning of each suborder of the register AR.

Figure 2:
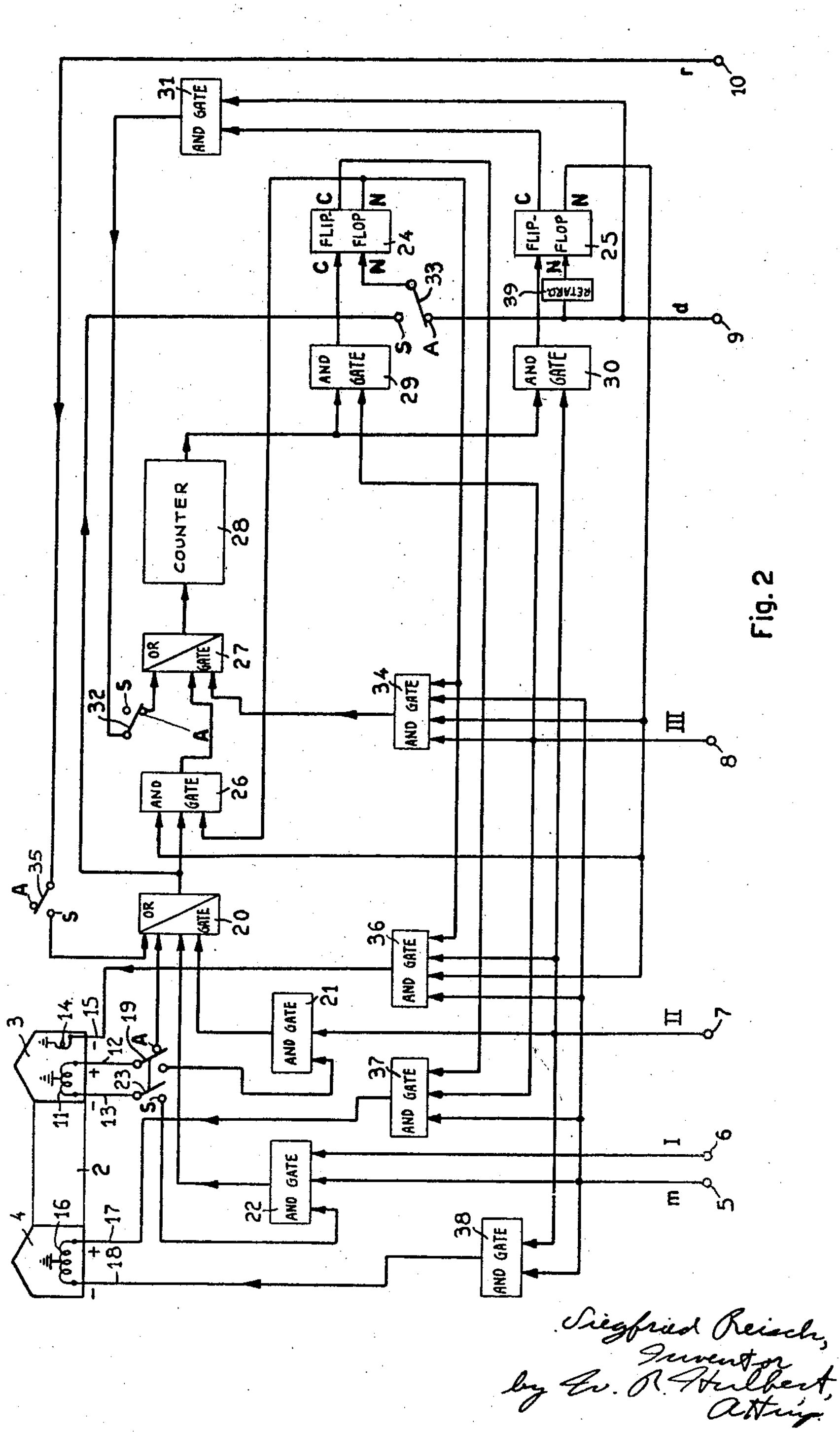
Fig. 2 is a block diagram of said apparatus.

Referring now to Fig. 2, the magnetic head 2 is provided with suitable sensing means and commutating means, namely, a reading coil 11 and a writing coil 14. The reading coil 11 is adapted to send signals through its outputs 12 and 13 according to the polarity of the cells read. More particularly, the output 12 is energized upon reading a positive point and the output 13 is energized upon reading a negative point. The writing coil 14 writes negative points when energized through its input 15. The magnetic head 4 is provided with a writing coil 16, which is likewise adapted to write positive points when energized at 17 and negative points when energized at 18.

The reference numerals 21, 22, 26, 29, 30, 31, 34, 36, 37 and 38 indicate each one an and-gate, which energizes its output when all its inputs are simultaneously energized. The reference numerals 20 and 27 indicate each one an or-gate, which energizes its output when one of its inputs is energized.

The reference numerals 24 and 25 indicate each one a flip-flop which may assume either of two stable states referred to hereinafter as state N (normal) and C (set). Fig. 2 shows for each flip-flop input the state to which the flip-flop is commutated by an impulse arriving through said input and, for each output, the state of the flip-flop by which said output is energized.

The reference numerals 19, 23, 32, 33 and 35 indicate switches which are integral with each other so as to be simultaneously shiftable from the position of addition (A) shown in Fig. 2 to a position of subtraction (S) and vice versa.

All the devices cited hereinabove, such as gates, flip-flops and switches are of conventional type and will not be described in detail.

The reference numeral 28 indicates a counting device having ten distinct stable states of equilibrium. As is known to those skilled in the art, such a device upon receiving a sequence of nine impulses is sequentially settable from a normal state to nine distinct stable states. Upon receiving the tenth impulse the device is temporarily set to an instable state and then immediately reset to its normal state, thereby generating an impulse. Such a device may be formed of a sequence discharge tube or of equivalent devices, such as a chain of ten conventional tubes or a circuit made of less than ten tubes of suitable type. In the present embodiment the counting device 28 is formed of a sequence discharge tube, which will be simply referred to as a tube.

The connections between the devices cited hereinbefore are clearly shown in Fig. 2 and will not be described in detail.

Furthermore, for ensuring a correct operation, a suitable retarding device 39 will be provided at the input N of the flip-flop 25 in order to enable the *d* signals to energize the gate 31 prior to the flip-flop 25.

*Addition*

Figure 3:
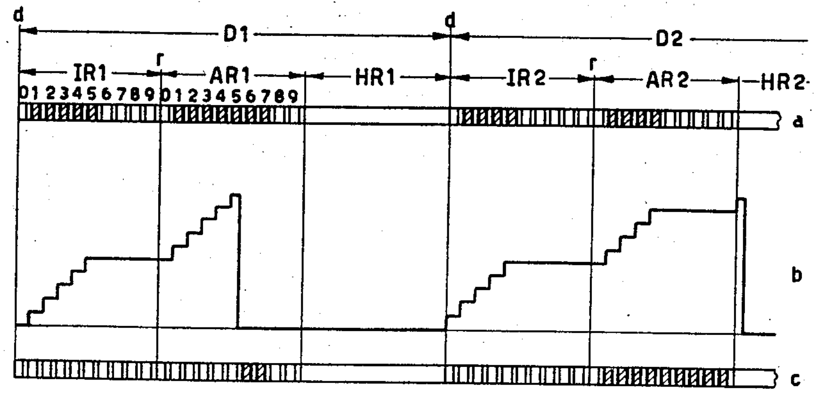
Fig. 3 is a schematical representation of an example of addition.

Referring now to Fig. 3, the diagram *a* represents the state of the accumulator at the beginning of an operation of addition of the amount 45 stored in IR with the amount 47 stored in AR. The diagram *b* respresents the sequential states of the tube 28 during the ensuing single accumulator cycle. The diagram *c* represents the final state of the accumulator, which shows the total 92 stored in AR.

At the beginning of the accumulator cycle, when the magnetic head 3 is in front of the cell "0" of the suborder IR1, the signal *d* resets the flip-flops 24 and 25 to their state N (Fig. 2).

During the phase I of the denominational order D1 the impulses sent by the output 12 of the reading coil 11 upon the reading of positive points pass the gate 20, the gates 21 and 22 being locked. Due to the state N of the flip-flops 24 and 25 said inpulses may pass the gate 26 and through the gate 27 they arrive to the tube 28. The tube 28 is thus sequentially set from its normal state to a state corresponding to the number of impulses received. As shown in the diagram *b* of Fig. 3, the tube 28 is set to the state "five," this being the figure stored in IR1. The impulses thereafter sent by the output 13 when the coil 11 reads the unfilled cells of IR1 are ineffective, the switch 23 being open.

The signal *r* sent at the beginning of the next following suborder AR1 is ineffective as well, the switch 35 being open. The impulses sent thereupon by the output 12 are again conveyed to the tube 28, which is thus sequentially set to its instable state and then reset to its normal state. As shown in Fig. 3, this happens in correspondence with the fifth filled cell of the suborder AR1. During this first part of the phase II the gate 36 is simultaneously energized at all its inputs, thereby energizing the writing coil 14. The first five positive points of the suborder AR1 are thus erased.

Upon being reset to its normal state the tube 28 generates an impulse which through the gate 30 sets the flip-flop 25 to the state C and thus locks the gate 36, the latter being connected to the state N of the flip-flop 25. The two positive points remaining in the suborder AR1 are the units of the total represented by the diagram *c* of Fig. 3. The state C of the flip-flop 25 locks the gate 26, whereby the remaining impulses sent by the output 12 are ineffective. The impulses sent thereafter by the output 13 are ineffective as well, due to the position of the switch 23.

During the phase II the input 18 of the writing coil 16 is invariably energized to write negative points, thus erasing the figure stored in IR1.

During the next following phase III the state C of the flip-flop 25 prevents the outputs of the gates 26, 34 and 36 from being energized. Moreover, the state N of the flip-flop 24 locks the gate 37. Therefore, in this case wherein the sum of the figures previously stored in IR1 and AR1 is more than nine, nothing happens during the phase III.

At the beginning of the next following denominational order D2 the signal *d* is sent, through the gates 31 and 27, to the tube 28, thus entering the transfer unit originated in the first denominational order. Said signal *d* resets thereupon the flip-flop 25 to its normal state.

During the denominational order D2 the mode of operation of the apparatus is similar to that described for the first denominational order. However, it should be noted that due to the transfer unit received from the lower order the final state of the tube 28 is one unit higher than the amount of positive points read in IR2 and AR2. The coil 14 erases all the positive points of the suborder AR2 and the coil 16 erases all the positive points of the suborder IR2. At the end of the phase II the tube 28 shows the total "nine" of the two corresponding figures, said total including the transfer unit received from the lower order.

During the phase III of the denominational order D2 the gates 36 and 38 are locked, thus discontinuing the energization of the writing coils 14 and 16. The gate 34 being now energized at all its inputs, the signals *m* are sent, through the gate 27, to the tube 28. The latter is thus set to its instable state by the first signal *m* sent during the phase III and thereupon reset to its normal state. The impulse thus generated by the tube 28 sets the flip-flop 24 to the state C. The flip-flop 24 locks the gate 34 and energizes the gate 37 which sends a sequence of impulses to the input 17 of the writing coil 16. Nine positive points will thus be written into the suborder AR2. The final state of the register AR, shown by the diagram *c* of Fig. 3, is thus 92, corresponding to the total of the addition performed.

The signal *d* sent at the beginning of the next denominational order D3 resets the flip-flop 24 to its normal state and the usual mode of operation is resumed.

It will thus be apparent that in each denominational order D*n* of the accumulator the tube 28 receives a number of impulses which is equal to the total of the figures stored in IR*n* and AR*n*, respectively, if said total is less than ten, whereas it stores ten impulses and is restored to its normal state, setting the flip-flop 25, if said total is equal to or more than ten.

In the first case (total less than ten) the two figures are erased and during the phase HR*n* a number of positive points equal to said total is writtten into AR*n*. To this end during the phase HR*n* the tube 28 is first set to its highest state and then a positive point is written into AR*n* during each remaining cell of HR*n*. The number of positive points thus written is equal to the ten complement of the ten complement of said total and thus to the total itself.

In the second case (total equal to or more than ten) the number of positive points erased in IR*n* and AR*n* is ten, thus leaving in AR*n* a number of positive points which is equal to said total less ten. At the beginning of the next following denominational order D $(n+1)$ the flip-flop 25 discharges into the tube 28 the transfer unit.

*Subtraction*

Before beginning an operation of subtraction the switches 19, 23, 32, 33 and 35 are shifted to their position of subtraction S.

Figure 4:
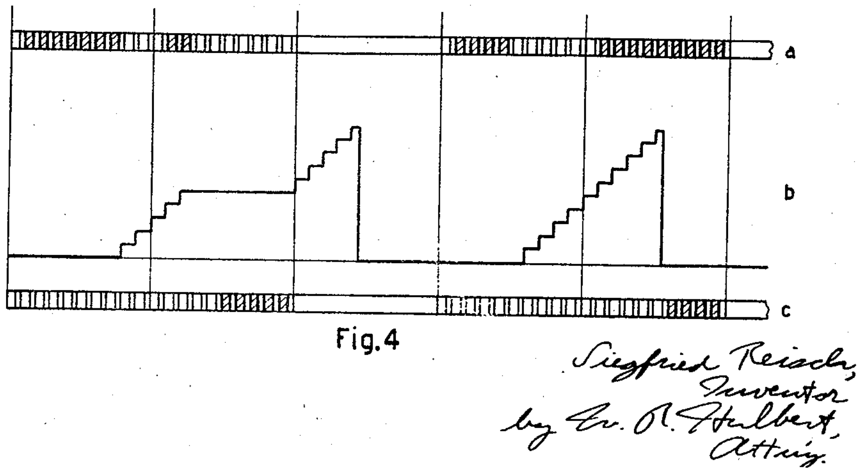
Fig. 4 is a schematical representation of an example of subtraction.

Referring now to Fig. 4, the diagram *a* represents the state of the accumulator at the beginning of a subtraction of the amount 47 from 92. The diagram *b* represents the sequential state of the tube 28 during the ensuing accumulator cycle and the diagram *c* represents the final state of the accumulator, showing the balance 45 stored in AR.

During the phase I of the denominational order D1 the impulses sent by the output 12 of the reading coil 11 are ineffective since the gate 21 is connected to the phase II. The impulses sent by the output 13 of the reading coil 11 in correspondence with the unfilled cells of the suborder AR1 pass the gates 22, 20 and 26 and are received by the tube 28. As shown in the diagram *b* of Fig. 4, at the end of the suborder IR1 the tube 28 is set to the state "two," this being the nine complement of the figure stored in IR1.

The signal *r* sent at the beginning of the next following suborder AR1 sets the tube 28 to its next higher state "three," this being the ten complement of the figure stored in IR1. The impulses sent thereafter by the output 12 of the coil 11 are then conveyed to the tube 28, setting the latter to its state "five."

The impulses sent by the output 13 of the coil 11 remain ineffective, since the gate 22 is connected to the phase I. The gate 36 being now energized at all its inputs, the writing coil 14 erases the positive points of AR1. At the same time the gate 38 energizes the input 18 of the writing coil 16, thus erasing the positive points of IR1.

During the next following phase III the gate 34 is energized at all its inputs, thereby sending a sequence of impulses to the tube 28. The latter is thus set to its instable state and then to its normal state. The impulse thereupon generated sets the flip-flop 24 to the state C. The gate 34 is thus locked and the gate 37 energizes the input 17 of the writing coil 16 to write five positive points into the suborder AR1, this figure being the balance of the units order.

During the phase I of the next following denominational order D2 the first impulse sent by the output 13 passes the gates 22 and 20 and resets the flip-flop 24 to the state N. Thus the flip-flop 24 is cleared from the transfer unit received from the denominational order D1. In the case, however, that the suborder IR2 has no unfilled cells the flip-flop 24 will be reset by the signal sent in correspondence with the first filled cell of AR2. Should the suborder AR2 as well as the higher suborders of AR have no filled cells and should the suborder IR3 as well as the higher suborders of IR have no unfilled cells, this case being that of a negative balance, the flip-flop 24 will not be reset until the next following accumulator cycle. The fugitive one will thus be transferred into the units order of the accumulator.

In the present example of subtraction the flip-flop 24 will be reset to its normal state N by the impulse sent by the output 13 in correspondence with the cell "5" of the suborder IR2. The sequence of impulses sent thereupon by the output 13 as well as the signal *r* sent at the beginning of the suborder AR2 are received by the tube 28 which is thus set to the state "five." The sequence of impulses sent by the output 12 in correspondence with the filled cells of AR2 passes the gates 21, 20, 26 and 27 and is received as well by the tube 28. The tube 28 is thus set to its highest state and reset to its normal state, thereby generating an impulse which sets the flip-flop 25 to the state C.

During this first part of the phase II the gate 36 energizes the writing coil 14 to erase the positive points of AR2. Then the flip-flop 25 locks the gate 36 and the four filled cells remaining in AR2 represent the tens of the computed balance. The impulses sent by the output 12 in correspondence with said cells are ineffective, since the gate 26 is locked by the state C of the flip-flop 25. However, during the entire phase II the gate 38 energizes the writing coil 16 to write negative points into the suborder IR2.

During the phase III the gate 34 is locked by the state C of the flip-flop 25 and the gate 37 is locked by the state N of the flip-flop 24.

At the beginning of the next denominational order D3 the signal *d* resets the flip-flop 25.

It will thus be apparent that during each denominational order D*n* of the accumulator the tube 28 stores a number of impulses depending upon the balance of the figures stored in the corresponding suborders IR*n* and AR*n*.

If said balance is negative, the tube 28 stores a number of impulses which is equal to the total of the figure of the minuend and of the ten complement of the figure of the subtrahend and is thus equal to the balance itself; if said balance is positive, the tube 28 stores ten impulses and is thereupon reset to its normal state.

In the first case (negative balance) the two figures are entirely erased from the corresponding suborders and during the phase HR*n* a number of positive points equal to said balance is written into AR*n*. To this end during the phase HR*n* the tube 28 is first set to its instable state, thus setting the flip-flop 24 and then a positive point is written into AR*n* for each remaining cell of HR*n*. The number of positive points thus written is equal to the ten complement of the ten complement of the computed balance and is, therefore, the balance itself. During the following order D $(n+1)$ the flip-flop 24 is reset, thus reducing one unit the number of impulses which will be stored in the tube 28.

In the second case (positive balance) all the positive points of IR*n* and an equal amount of positive points of AR*n* will be erased, thus leaving in AR*n* a number of positive points which is equal to the computed balance.

If it is not desired to erase the amount stored in IR, as is the case when making operations of multiplication or division by the method of repeated additions and/or subtractions, it will only be necessary to disconnect the input 18 from the gate 38, by means of any suitable switch.

From the foregoing description it will be evident to those skilled in the art that the invention may with equal facility be applied to other kinds of digital apparatus.

It will also be understood that many changes may be made in the above diagram, and different embodiments of the invention could be made without departing from the scope thereof. It is therefore intended that all matter contained in the above description, or shown in the accompanying drawing, shall be interpreted as illustrative, and not in a limiting sense.

What I claim is:

1. In a digital computing apparatus, an accumulator including a register having a plurality of bistable unit accumulating elements arranged in denominational orders according to a numerical notation having a predetermined base, means for sensing said elements to generate an impulse for each element which is in a certain one of its two stable conditions according to an amount stored in said register, means operable for commutating said elements to said certain condition, means for mounting said sensing and said commutating means to enable said elements to be sequentially presented to said sensing means and said commutating means, said accumulator being cyclically movable with respect to said mounting means and including means for sequentially generating a read out pulse for each unit of an order of an amount to be entered into said register, a storing device sequentially settable to a number of distinct stable states which is equal to said base to store one unit for each one of its states, said device generating a signal and being reset to its lowest state upon being set through its highest state, means for entering into said device said read out pulses and the impulses generated by said sensing means during the corresponding order of said stored amount, means operable by said device if the total of said read out pulses and said impulses so entered is smaller than said base for operating said commutating means to commutate a number of elements equal to said total during the presentation of a single order of said register, and further means operable by said device if the total of said read out pulses and said impulses so entered is equal to or larger than said base for causing a unit to be transferred to the next higher order of said register.

2. In the digital computing apparatus as claimed in claim 1, means controlled by said further means for disabling said entering means.

3. In a digital computing apparatus, an accumulating register having a plurality of bistable unit accumulating elements arranged in denominational orders according to a numerical notation having a predetermined base, means for sensing said elements to generate an impulse upon the sensing of each element which is in a certain one of its two stable conditions according to an amount stored in said register, first commutating means operable for commutating said elements to the other of said two conditions, second commutating means operable for commutating said elements to said certain condition, means for mounting said sensing means and said first and second commutating means, said first commutating means being enabled to commutate the elements actually sensed by said sensing means, said second commutating means being arranged at a distance of one order of said stored amount towards the lower orders with respect to said first commutating means, means for cyclically moving said accumulating register with respect to said mounting means to sequentially present said elements to said sensing and said first and second commutating means from the lower orders towards the higher orders, means for sequentially generating a read out pulse for each unit of an order of an amount to be entered into the accumulating register, a storing device sequentially settable to a number of distinct stable states which is equal to said base to store one unit for each one of its states, said device generating a signal and being reset to its lowest state upon being set through its highest state, first means for entering into said device said read out pulses and the impulses generated by said sensing means during the order of said stored amount corresponding to said order of the amount to be entered, means for retarding the presentation of an order of said stored amount to said mounting means a fixed period of time with respect to the presentation of the next lower order, means for generating a number of clock pulses equal to said base during said period, second means for entering said clock pulses into said device, means jointly operable by said device upon being set through its highest state and by said second entering means for operating said second commutating means, timing means for generating a phase signal during said presentation of an order of said stored amount to operate said first commutating means, and further means jointly operable by said device upon being set through its highest state and by said timing means for entering an impulse into said device to transfer one unit to the next higher order of said stored amount.

4. In the digital computing apparatus as claimed in claim 3, means controlled by said further means for disabling said first and second entering means and said first commutating means.

5. In a digital computing apparatus, an accumulator having a number of denominational orders according to a numerical notation with a predetermined base, said accumulator being subdivided into an input register and an accumulating register, said registers being interspersed whereby each order of the accumulator is formed of the corresponding suborders of said registers, each suborder having a plurality of bistable unit accumulating elements, means for sensing the elements of said registers to generate an impulse upon the sensing of each element which is in a certain one of its two stable conditions, first commutating means operable for commutating said elements to the other of said two conditions, second commutating means operable for commutating said elements to said certain condition, mounting means for mounting said sensing means and said first and second commutating means, said first commutating means being enabled to commutate the element actually sensed by said sensing means, said second commutating means being arranged at a distance of one suborder towards the lower orders with respect to said first commutating means, means for cyclically moving said accumulator with respect to said mounting means to sequentially present said elements to said sensing and said first and second commutating means from the lower orders towards the higher orders, first generating means operative during said presentation for generating a phase signal identifying the suborders of said accumulating register to operate said first commutating means, a storing device sequentially settable to a number of distinct stable states which is equal to said base, said device generating a signal and being reset to its lowest state upon being set through its highest state, first means for entering into said device the impulses generated by said sensing means, said registers being mounted on said accumulator with a gap between each suborder of the accumulating register and the next higher suborder of the input register to introduce a fixed period of time between said presentation of the elements of each suborder of the accumulating register and the elements of the next higher suborder of the input register, second generating means for generating a number of clock pulses equal to said base during said period, second entering means for entering said clock pulses into said storing device, third entering means operable for entering one impulse into said storing device, and multistable means adapted to control operation of said second commutating means and of said second and third entering means, said multistable means being settable to a first condition by said storing device under the control of said second generating means for operating said second commutating means and for disabling said second entering means, said multistable means being settable to a second condition by said storing device under the control of said first generating means for operating said third entering means.

6. In a digital computing apparatus comprising a decimal accumulator of the type having its denominational orders arranged on a single magnetic track cyclically movable past a first and a second magnetic head from the lower orders toward the higher orders, a digital unit being entered into said accumulator by recording a certain one of two different magnetic conditions in an elemental area of said track, said accumulator being subdivided into an input register and an accumulating register, said registers being interspersed whereby each suborder of one register alternates with the corresponding suborder of the other register along said track, said first magnetic head comprising a reading coil and a first writing coil, said writing coil being operable for recording the other of said two magnetic conditions in the elemental area actually sensed by said reading coil, said second magnetic head comprising a second writing coil operable for recording said certain magnetic condition, said second magnetic head being arranged at a distance of one of said suborders towards the lower orders from said first magnetic head, the combination of a predetermined counter having ten distinct stable states, first means for entering into said counter the impulses generated by said reading coil responsive to said certain condition of the elemental areas of said registers, a gap corresponding to the length of ten consecutive elemental areas being provided on said track between each suborder of said accumulating register and the next higher suborder of said input register, first means for generating ten clock pulses during the movement of said gap past said first magnetic head, second means for entering said clock pulses into said counter, third means operable for entering one impulse into said counter, second means for generating a phase signal for identifying the suborders of said accumulating register, said second generating means being adapted to operate said first writing coil, third means for generating a phase signal for identifying said gap, a first bistable multivibrator settable by said counter under the control of said second generating means and adapted upon being set to operate said third entering means, and a second bistable multivibrator settable by said counter under the control of said third generating means and adapted upon being set to operate said second writing coil and to disable said second entering means.

7. In the digital computing apparatus as claimed in claim 6, means controlled by said first multivibrator upon being so set for disabling said first and second entering means and said first writing coil.

8. In a digital computing apparatus, an accumulator having a number of denominational orders according to a numerical notation with a predetermined base, said accumulator being subdivided into an input register and an accumulating register, said registers being interspersed whereby each order of the accumulator is formed of the corresponding suborders of said registers, each suborder having a number equal to said base less one of bistable unit accumulating elements, means for sensing the elements of said registers, first means controlled by said sensing means for generating an impulse upon the sensing of each element of said input register which is in a certain one of its two stable conditions, second means controlled by said sensing means for generating an impulse upon the sensing of each element of said accumulating register which is in the other of said two conditions, first commutating means operable for commutating the elements of said accumulating register to said certain condition, second commutating means operable for commutating the elements of said accumulating register to said other condition, mounting means for mounting said sensing means and said first and second commutating means, said first commutating means being enabled to commutate the element actually sensed by said sensing means, said second commutating means being arranged at a distance of one suborder towards the lower orders with respect to said first commutating means, means for cyclically moving said accumulator with respect to said mounting means to sequentially present said elements to said sensing and said first and second commutating means from the lower orders towards the higher orders, first generating means operative during said presentation for generating a phase signal identifying the suborders of said accumulating register to operate said first commutating means, second generating means operative during said presentation for generating one impulse at the beginning of the suborders of said accumulating register, a storing device sequentially settable to a number of distinct stable states which is equal to said base, said device generating a signal and being reset to its lowest state upon being set through its highest state, first entering means for entering into said device the impulses generated by said first and second controlled means and by said second generating means, said registers being mounted on said accumulator with a gap between each suborder of the accumulating register and the next higher suborder of the input register to introduce a fixed period of time between said presentation of the elements of each suborder of the accumulating register and the elements of the next higher suborder of the input register, third generating means for generating a number of clock pulses equal to said base during said period, second entering means for entering said clock pulses into said storing device, and multistable means adapted to control operation of said first and second commutating means and of said first and second entering means, said multistable means being settable to a first condition by said storing device under the control of said third generating means for operating said second commutating means and for disabling said first entering means so as to prevent the first impulse of the impulses to be entered by said first entering means from being entered into said storing device during the next following order of the accumulator, said multistable means being settable to a second condition by said storing device under the control of said first generating means for disabling said first and second entering means and said first commutating means.

9. In a recirculating device for digital amounts, a magnetic memory of the type wherein the denominational orders of a stored amount are arranged according to a numerical notation with a predetermined base on a magnetic track cyclically movable past a first and a second magnetic head, a digital unit being entered into said memory by recording a certain one of two different magnetic conditions in an elemental area of said track, said first magnetic head including a reading coil and a first writing coil operable for recording the other of said two magnetic conditions in the elemental area actually sensed by said reading coil, said second magnetic head comprising a second writing coil operable for recording said certain magnetic condition and being arranged at a distance of one of said orders ahead with respect to said first magnetic head, means for operating said first writing coil, a single predetermined counter having a number of distinct stable states equal to said base, first means for entering into said counter the impulses generated by said reading coil responsive to said certain condition of the elemental areas of said track, said orders being spaced apart along said track a distance corresponding to one of said orders, means for generating clock pulses during said space, second means for entering said clock pulses into said counter, and means jointly controlled by said counter and said generating means for operating said second writing coil and disabling said second entering means, whereby said multiorder stored amount may be erased and reentered order by order during a single cycle of said track.

References Cited in the file of this patent

UNITED STATES PATENTS 2,609,143 Stibitz ---------------- Sept. 2, 1952
2,700,148 McGuigan et al. ---------- Jan. 18, 1955
2,770,797 Hamilton ---------------- Nov. 13, 1956
2,787,416 Hansen ---------------- Apr. 2, 1957
2,790,599 Gloess ---------------- Apr. 30, 1957
2,867,379 Burns ---------------- Jan. 6, 1959

FOREIGN PATENTS 703,593 Great Britain ------------ Feb. 3, 1954